US008687270B2

(12) United States Patent
Manes et al.

(10) Patent No.: US 8,687,270 B2
(45) Date of Patent: Apr. 1, 2014

(54) MULTI-PASS AMPLIFIER ARCHITECTURE FOR HIGH POWER LASER SYSTEMS

(75) Inventors: Kenneth R. Manes, Brentwood, CA (US); Mary L. Spaeth, Brentwood, CA (US); Alvin C. Erlandson, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 133 days.

(21) Appl. No.: 13/072,581

(22) Filed: Mar. 25, 2011

(65) Prior Publication Data

US 2011/0273766 A1    Nov. 10, 2011

Related U.S. Application Data

(60) Provisional application No. 61/318,136, filed on Mar. 26, 2010.

(51) Int. Cl.
*H01S 3/23* (2006.01)
*H01S 3/05* (2006.01)
*H01S 3/081* (2006.01)

(52) U.S. Cl.
USPC ............. 359/346; 359/342; 359/347; 372/66; 372/68; 372/34; 372/99; 372/106

(58) Field of Classification Search
CPC ... H01S 3/0604; H01S 3/0813; H01S 3/2333; H01S 3/2308; H01S 3/2325; H01S 3/0602; H01S 3/0404; H01S 3/08054; H01S 3/10007
USPC .......... 359/346, 342, 347; 372/66, 68, 34, 99, 372/106
See application file for complete search history.

(56) References Cited

U.S. PATENT DOCUMENTS 3,798,571 A * 3/1974 Segre .............................. 372/33
3,928,811 A * 12/1975 Hughes ......................... 359/343
(Continued)

FOREIGN PATENT DOCUMENTS

WO        WO 86/01345 A1      2/1986
WO        WO 2009/058185 A2   5/2009

OTHER PUBLICATIONS

Bourque, R.F.; Wong, C.P.C.; , "Thermal-hydraulic analysis of a high-pressure helium-cooled shield/blanket for ITER," Fusion Engineering, 1993., 15th IEEE/NPSS Symposium on , vol. 1, No., pp. 273-276 vol. 1, Oct. 11-15 1993 doi: 10.1109/FUSION.1993.518329 URL: http://ieeexplore.ieee.org/stamp/stamp.jsp?tp=&arnumber=518329&isnumber=11418.*

(Continued)

*Primary Examiner* — Mark Hellner
*Assistant Examiner* — Ari M Diacou
(74) *Attorney, Agent, or Firm* — Kilpatrick Townsend & Stockton

(57) ABSTRACT

A main amplifier system includes a first reflector operable to receive input light through a first aperture and direct the input light along an optical path. The input light is characterized by a first polarization. The main amplifier system also includes a first polarizer operable to reflect light characterized by the first polarization state. The main amplifier system further includes a first and second set of amplifier modules. Each of the first and second set of amplifier modules includes an entrance window, a quarter wave plate, a plurality of amplifier slablets arrayed substantially parallel to each other, and an exit window. The main amplifier system additionally includes a set of mirrors operable to reflect light exiting the first set of amplifier modules to enter the second set of amplifier modules and a second polarizer operable to reflect light characterized by a second polarization state.

23 Claims, 12 Drawing Sheets

(56) References Cited

U.S. PATENT DOCUMENTS

| | | | | |
|---|---|---|---|---|
| 4,039,962 A * | 8/1977 | Hughes | | 359/345 |
| 4,132,955 A * | 1/1979 | Hughes | | 359/345 |
| 4,186,353 A * | 1/1980 | Boutineau | | 359/257 |
| 4,559,627 A * | 12/1985 | Chun | | 372/92 |
| 4,563,763 A | 1/1986 | Kuhn | | |
| 4,575,849 A * | 3/1986 | Chun | | 372/9 |
| 4,642,809 A * | 2/1987 | Petheram | | 372/66 |
| 4,682,340 A * | 7/1987 | Dave et al. | | 372/108 |
| 4,698,816 A * | 10/1987 | Chun | | 372/19 |
| 4,725,787 A * | 2/1988 | Chandra | | 359/338 |
| 4,734,911 A * | 3/1988 | Bruesselbach | | 372/21 |
| 4,837,769 A * | 6/1989 | Chandra et al. | | 372/41 |
| 4,918,395 A * | 4/1990 | Difonzo et al. | | 359/346 |
| 4,969,169 A * | 11/1990 | Forsyth | | 378/34 |
| 4,989,216 A * | 1/1991 | Chandra et al. | | 372/97 |
| 5,018,163 A * | 5/1991 | Daunt et al. | | 372/68 |
| 5,260,954 A * | 11/1993 | Dane et al. | | 372/25 |
| 5,268,787 A * | 12/1993 | McIntyre | | 359/347 |
| 5,652,763 A * | 7/1997 | Delfyett, Jr. | | 372/107 |
| 5,742,634 A | 4/1998 | Rieger et al. | | |
| 5,832,020 A * | 11/1998 | Kong | | 372/72 |
| 6,373,866 B1 * | 4/2002 | Black | | 372/16 |
| 6,510,170 B1 | 1/2003 | Ravnitzki et al. | | |
| 6,556,339 B2 * | 4/2003 | Smith et al. | | 359/334 |
| 6,676,264 B1 * | 1/2004 | Mima et al. | | 359/853 |
| 6,700,698 B1 | 3/2004 | Scott | | |
| 6,847,673 B2 | 1/2005 | Dane et al. | | |
| 6,993,059 B2 * | 1/2006 | Anikitchev et al. | | 372/106 |
| 7,058,093 B2 | 6/2006 | Kennedy et al. | | |
| 7,075,959 B1 * | 7/2006 | Downing et al. | | 372/35 |
| 7,083,290 B2 * | 8/2006 | Masaki et al. | | 353/122 |
| 8,094,374 B2 * | 1/2012 | Chen et al. | | 359/485.06 |
| 8,284,809 B2 * | 10/2012 | Armstrong et al. | | 372/38.09 |
| 8,416,830 B2 * | 4/2013 | Ovtchinnikov et al. | | 372/102 |
| 2003/0072341 A1 * | 4/2003 | Stappaerts | | 372/40 |
| 2003/0156615 A1 * | 8/2003 | Kennedy et al. | | 372/55 |
| 2006/0262815 A1 * | 11/2006 | Klimov et al. | | 372/18 |
| 2007/0041082 A1 * | 2/2007 | Bullington et al. | | 359/333 |
| 2007/0195322 A1 | 8/2007 | Rieger | | |
| 2008/0025356 A1 * | 1/2008 | Rothenberg | | 372/35 |
| 2008/0203326 A1 * | 8/2008 | Neukirch | | 250/504 R |
| 2009/0028206 A1 * | 1/2009 | Borneis et al. | | 372/102 |
| 2011/0043899 A1 * | 2/2011 | Erlandson | | 359/347 |
| 2011/0058249 A1 * | 3/2011 | Erlandson | | 359/333 |
| 2011/0170563 A1 * | 7/2011 | Heebner et al. | | 372/3 |
| 2011/0170567 A1 * | 7/2011 | Armstrong et al. | | 372/38.02 |
| 2011/0279889 A1 * | 11/2011 | Li et al. | | 359/337.5 |
| 2012/0114008 A1 * | 5/2012 | Bayramian et al. | | 372/75 |
| 2012/0229889 A1 * | 9/2012 | Suganuma et al. | | 359/344 |
| 2012/0236882 A1 * | 9/2012 | Caird et al. | | 372/9 |

OTHER PUBLICATIONS

Dr. Rüdiger Paschotta. Faraday Rotators. Encyclopedia of Laser Physics and Technology. RP Photonics Consulting GmbH. http://www.rp-photonics.com/faraday_rotators.html. Downloaded: May 29, 2013, Updated Mar. 22, 2009.*

Erlandson, A. C. et al., "The Effect of Amplifier Component Maintenance on Laser System Availability and Reliability for the US National Ignition Facility", $2^{nd}$ Annual International Conference on Solid-State Lasers for Application to Inertial Confinement Fusion, Paris, France, 1996, 13 pages.

Martinez, M. D., et al., Performance Results of the High Gain, Nd: Glass, Engineering Prototype Preamplifier Module (PAM) for the National Ignition Facility (NIF), Photonics West 99 Symposium, San Jose, CA, 1999, 14 pages.

Spaeth, M. L., et al., "National Ignition Facility Wavefront Requirements and Optical Architecture", Society of Photo-Optical Instrumentation Engineers, Opt. Eng. 43(12) 2854-2865, 2004, 12 pages.

International Search Report and the Written Opinion of the International Searching Authority for corresponding International Application No. PCT/US2011/030081 mailed on Jun. 1, 2011, 18 pages.

Boyd, "Nonlinear Optics, Chapter 4: The Intensity-Dependent Refractive Index", Nonlinear Optics, Academic Press, Amsterdam, Jan. 1, 2003, 16 pages.

Wonterghem, "Performance of the NIF Prototype Beamlet", Fusion Technology, American Nuclear Society. Lagrange Park, Illinois, US, vol. 26, No. 3, Part 2, Nov. 1, 1994, 6 pages.

Supplemental European Search Report for corresponding European Patent Application No. 11760349.8 dated Jul. 31, 2013, 9 pages.

* cited by examiner

MULTI-PASS AMPLIFIER ARCHITECTURE FOR HIGH POWER LASER SYSTEMS

CROSS-REFERENCES TO RELATED APPLICATIONS

This application claims priority to U.S. Provisional Patent Application No. 61/318,136, filed on Mar. 26, 2010, entitled "Multi-Pass Amplifier Architecture for High Power Laser Systems," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND OF THE INVENTION

Projections by the Energy Information Agency and current Intergovernmental Panel on Climate Change (IPCC) scenarios expect worldwide electric power demand to double from its current level of about 2 terawatts electrical power (TWe) to 4 TWe by 2030, and could reach 8-10 TWe by 2100. They also expect that for the next 30 to 50 years, the bulk of the demand of electricity production will be provided by fossil fuels, typically coal and natural gas. Coal supplies 41% of the world's electric energy today, and is expected to supply 45% by 2030. In addition, the most recent report from the IPCC has placed the likelihood that man-made sources of $CO_2$ emissions into the atmosphere are having a significant effect on the climate of planet earth at 90%. "Business as usual" baseline scenarios show that $CO_2$ emissions could be almost two and a half times the current level by 2050. More than ever before, new technologies and alternative sources of energy are essential to meet the increasing energy demand in both the developed and the developing worlds, while attempting to stabilize and reduce the concentration of $CO_2$ in the atmosphere and mitigate the concomitant climate change.

Nuclear energy, a non-carbon emitting energy source, has been a key component of the world's energy production since the 1950's, and currently accounts for about 16% of the world's electricity production, a fraction that could—in principle—be increased. Several factors, however, make its long-term sustainability difficult. These concerns include the risk of proliferation of nuclear materials and technologies resulting from the nuclear fuel cycle; the generation of long-lived radioactive nuclear waste requiring burial in deep geological repositories; the current reliance on the once through, open nuclear fuel cycle; and the availability of low cost, low carbon footprint uranium ore. In the United States alone, nuclear reactors have already generated more than 55,000 metric tons (MT) of spent nuclear fuel (SNF). In the near future, we will have enough spent nuclear fuel to fill the Yucca Mountain geological waste repository to its legislated limit of 70,000 MT.

Fusion is an attractive energy option for future power generation, with two main approaches to fusion power plants now being developed. In a first approach, Inertial Confinement Fusion (ICF) uses lasers, heavy ion beams, or pulsed power to rapidly compress capsules containing a mixture of deuterium (D) and tritium (T). As the capsule radius decreases and the DT gas density and temperature increase, DT fusion reactions are initiated in a small spot in the center of the compressed capsule. These DT fusion reactions generate both alpha particles and 14.1 MeV neutrons. A fusion burn front propagates from the spot, generating significant energy gain. A second approach, magnetic fusion energy (MFE) uses powerful magnetic fields to confine a DT plasma and to generate the conditions required to sustain a burning plasma and generate energy gain.

Important technology for ICF is being developed primarily at the National Ignition Facility (NIF) at Lawrence Livermore National Laboratory (LLNL), assignee of this invention, in Livermore, Calif. There, a laser-based ICF project designed to achieve thermonuclear fusion ignition and burn utilizes laser energies of 1 to 1.3 MJ. Fusion yields of the order of 10 to 20 MJ are expected. Fusion yields in excess of 200 MJ are expected to be required in a central hot spot fusion geometry if fusion technology, by itself, were to be used for cost effective power generation. Thus, significant technical challenges remain to achieve an economy powered by pure ICF energy.

In addition to ICF applications, there is broad interest in the area of high-average-power lasers for materials processing, drilling, cutting and welding, military applications, and the like. Many of the lasers that have been demonstrated at high average power have operated in a continuous wave (cw) mode, but there is also interest in rep-rated pulsed lasers that are also capable of producing high average power.

SUMMARY OF THE INVENTION

The present invention relates generally to laser systems. More specifically, the present invention relates to methods and systems for generating high power laser beams using a three-dimensional amplifier geometry. Merely by way of example, the invention has been applied to an amplifier assembly utilizing the polarization state of the beam being amplified to direct the beam through multiple amplifier stages along a predetermined optical path. In a particular embodiment, the three-dimensional amplifier geometry described herein enables suppression of parasitic modes to be performed using an electro-optic switch operating at power levels less than that of the final amplified beam. The methods and systems can be applied to a variety of other laser amplifier architectures and laser systems.

According to an embodiment of the present invention, a main amplifier system is provided. The main amplifier system includes a first reflector operable to receive input light through a first aperture and direct the input light along an optical path. The input light is characterized by a first polarization. The main amplifier system also includes a first polarizer disposed along the optical path. The first polarizer is operable to reflect light characterized by the first polarization state. The main amplifier system further includes a first set of amplifier modules disposed along the optical path and a second set of amplifier modules disposed along the optical path. Each of the first set of amplifier modules includes an entrance window, a quarter wave plate, a plurality of amplifier slablets arrayed substantially parallel to each other, and an exit window. Each of the second set of amplifier modules includes an entrance window, a quarter wave plate, a plurality of amplifier slablets arrayed substantially parallel to each other, and an exit window. The main amplifier system additionally includes a set of mirrors operable to reflect light exiting the first set of amplifier modules to enter the second set of amplifier modules and a second polarizer disposed along the optical path. The second polarizer is operable to reflect light characterized by a second polarization state. The main amplifier system also includes a second reflector disposed along the optical path and operable to direct light through a second aperture.

According to another embodiment of the present invention, a method of amplifying an input pulse is provided. The method includes receiving, through a first aperture, an input pulse having a first polarization state along a beamline of an amplifier system, reflecting the input pulse off an input mirror, and reflecting the input pulse off a first polarizer as a result of the input pulse having the first polarization state. The method also includes converting the first polarization state into a first intermediate polarization state, amplifying the input pulse to provide an amplified pulse having the first intermediate polarization state, and converting the amplified pulse into having the first intermediate polarization state into an amplified pulse having a second polarization state. The method further includes passing the amplified pulse through the first polarizer as a result of the amplified pulse having the second polarization state and passing the amplified pulse through a second polarizer as a result of the amplified pulse having the second polarization state. The method additionally includes converting the second polarization state into a second intermediate polarization state, amplifying the amplified pulse to provide an output pulse having the second intermediate polarization state, and converting the second intermediate polarization state into the first polarization state. Moreover, the method includes reflecting the output pulse off the second polarizer as a result of the output pulse having the first polarization state, reflecting the amplified pulse off an output mirror, and directing the output pulse having the first polarization state along the beamline of the amplifier system, through a second aperture.

Embodiments of the present invention combine the efficiencies of four pass energy extraction from a laser with a quad-based architecture to provide a new rep-rateable laser system architecture. The designs described herein reduce or eliminate the need for a high average power optical switch as the individual beamlines in the high energy laser systems are scaled to many multi-kilojoule pulses per second while maintaining laser extraction efficiency and enhancing laser system compactness.

Numerous benefits are achieved by way of the present invention over conventional techniques. For example, embodiments of the present invention provide laser systems useful for Laser Inertial Fusion Engine (LIFE) applications, including pure fusion LIFE engines, other users of pulsed average power lasers, and for pumping of various laser media in order to generate ultra-short laser pulses. Moreover, embodiments of the present invention provide architectures for laser systems operating in the stored energy, high average power mode of operation with performance characteristics not available using conventional designs. Embodiments of the present invention enable four-pass amplification of the beams within a quad, without the necessity of a large-aperture optical switch. Moreover, embodiments of the present invention enable the use of pressurized gas cooling using the space between amplifier slabs (e.g., slablets), windows, and/or quarter-wave plates. In a particular embodiment, the cooling flow rates are suitably low that a variety of anti-reflection coatings on the windows, slabs and quarter-wave plates can be used, including sol-gel, hardened sol-gel, or ammonia-hardened sol-gel coatings.

Furthermore, embodiments of the present invention provide amplifier systems for which the overall laser amplifier can be short in length by allowing the amplifier slablets to be packed together closely. In embodiments that utilize close-packed amplifier slablet configurations, the laser slablets may be pumped using edges of the slablets. A benefit provided by an edge-pumped configuration is that the output profile of the laser beams can be optimized using gradient doping of the laser amplifier slablets. Moreover, embodiments of the present invention are characterized by a non-linear index of the laser amplifier slablets that is reduced by a factor of $\frac{2}{3}$ by the use of circular polarization in comparison to that produced using linear polarization. Additionally, by concentrating the optical components within a short distance compared to the overall length of the amplifying media, the BT-gain spectra can be shifted to larger angles, allowing easier removal of parasitic modes. Furthermore, embodiments of the present invention enable relay imaging without the need for an additional cavity telescope and angle discriminating reflectors (such as Rugate) can be used to remove high angle parasitic laser modes. The laser architecture described herein is amenable to the use of corrector plates, adaptive optics, and spatial beam shapers to mitigate birefringence, phase defects, and amplitude errors, as appropriate to the particular application. Also, the compact nature of embodiments of the present invention may permit the assembly of laser modules of a size commensurate with a LIFE Inertial Fusion Energy (IFE) power plant. These and other embodiments of the invention along with many of its advantages and features are described in more detail in conjunction with the text below and attached figures.

DETAILED DESCRIPTION OF THE INVENTION

Embodiments of the present invention relate to laser systems. More specifically, the present invention relates to methods and systems for amplifying high power laser beams using a three-dimensional amplifier geometry. Merely by way of example, the invention has been applied to an amplifier assembly utilizing the polarization state of the beam being amplified to direct the beam through multiple amplifier stages along a predetermined optical path. In a particular embodiment, the three-dimensional amplifier geometry described herein enables suppression of parasitic modes to be performed using an electro-optic switch operating at power levels less than that of the final amplified beam. The methods and systems can be applied to a variety of other laser amplifier architectures and laser systems.

Figure 1:
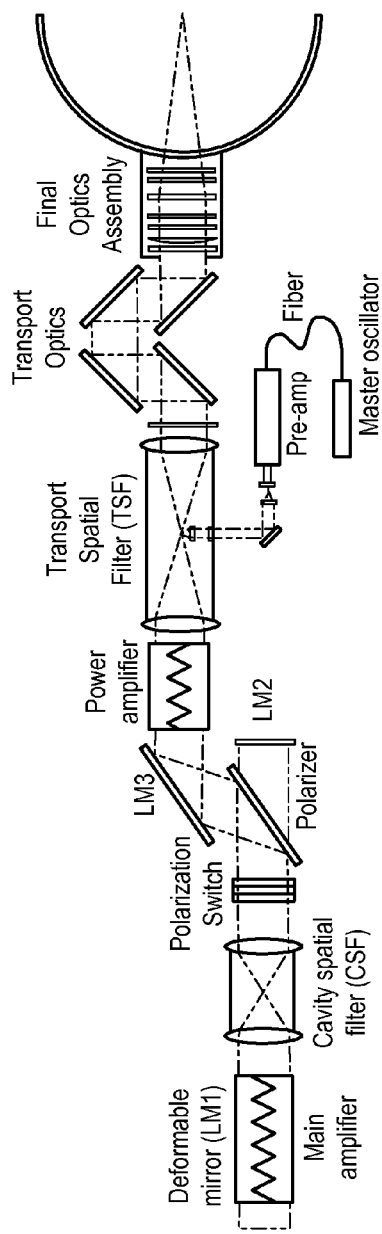
FIG. 1 is a simplified schematic diagram of the NIF beamline.

FIG. 1 is a simplified schematic diagram of the NIF beamline. As illustrated in FIG. 1, light from the master oscillators and fiber optically coupled preamplifiers is injected into the beamline at the Transport Spatial Filter (TSF). Initially light propagates through the Power Amplifier and reflects off LM3. The light then reflects off the polarizer and begins the first of four passes through the main amplifier. Initially, the polarization switch is in a state to pass the light propagating towards the main amplifier. After a first pass through the main amplifier and reflection off of the deformable mirror (LM1), the light makes a second pass through the main amplifier. By the time the light returns to the polarization switch, the polarization switch changes the polarization of the light so that it is aligned with the polarizer, which passes through the polarizer and reflects off LM2. The light then makes two more passes through the main amplifier, has the polarization changed by the polarization switch again, and reflects off the polarizer and LM3 in order to make a second pass through the power amplifier. Thus, the NIF architecture utilizes two passes through the power amplifier and four passes through the main amplifier.

Figure 2:
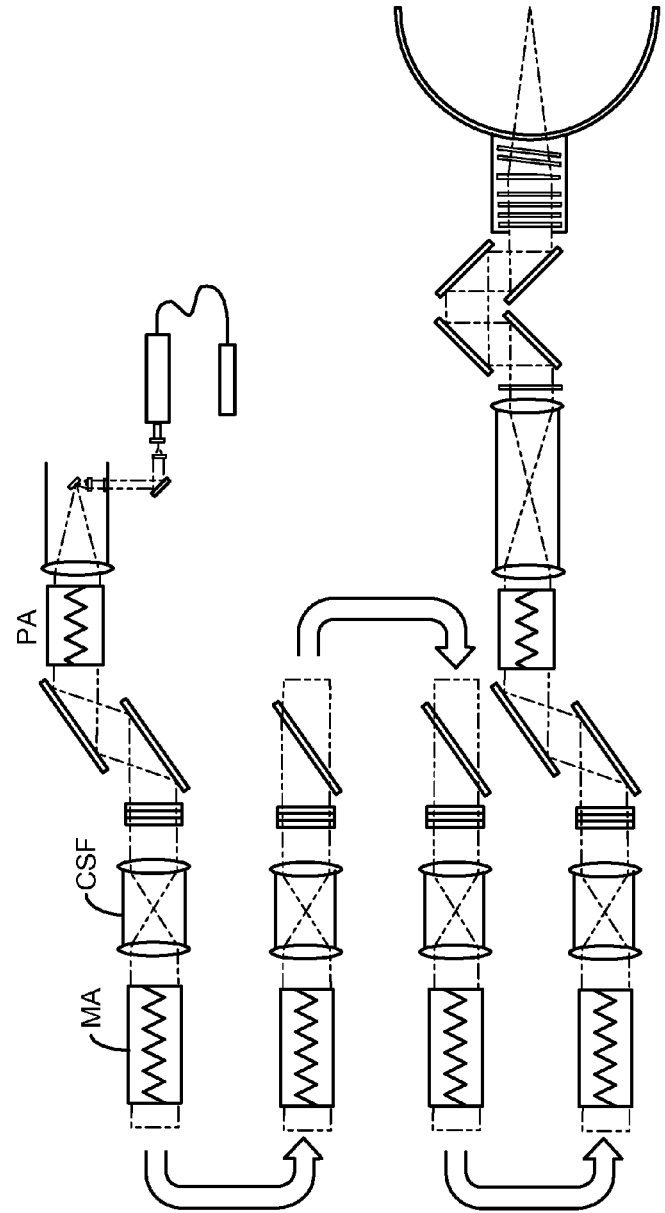
FIG. 2 is a simplified unfolded view of the NIF beamline.

FIG. 2 is a simplified unfolded view of the NIF beamline. An analysis of the unfolded view illustrates that the amplified pulse traverses the same optical components on each of the four passes through the main amplifier.

As the repetition rate of the architecture illustrated in FIG. 1 is increased to repetition rates of several hertz, it is likely the polarization switch will need to be actively cooled. In one implementation, the polarization switch is a plasma electrode Pockels cell (PEPC). It should be noted that the light intensity at the TSF focus after four passes through the main amplifier and two passes through the power amplifier is on the order of $10^{18}$ W/cm$^2$. At these power levels and operation at several hertz, the pinholes used in the spatial filters will begin to melt or ablate, a process that can occur at intensities as low as $10^8$ W/cm$^2$. Melting, solidifying, ablation, erosion, vapor production, and the like are thus issues presented during high repetition operation of the architecture illustrated in FIG. 1.

As discussed in commonly assigned International Patent Application No. PCT/US2008/011335, filed on Sep. 30, 2008, the contents of which is hereby incorporated by reference in its entirety, some LIFE systems utilize booster amplifiers having slablets that are spaced apart by a small distance to allow a cooling channel between each pair of slablets. Slablets are used in these designs rather than a single slab because the slablets are easier to cool, and easier to replace if necessary. To maintain appropriate temperatures, the slablets are enclosed between windows and helium is pumped between the slablets, for example in a direction perpendicular to the surface of the slablets. The use of slablets increases the number of surfaces that have to be finished, and consequently increases the surface area of the gain media. Because surface imperfections are additive as light propagates through the surface imperfections repeatedly, the inventors have determined that it is preferable to avoid passing the light through the same portion of the gain medium more than once.

Figure 3:
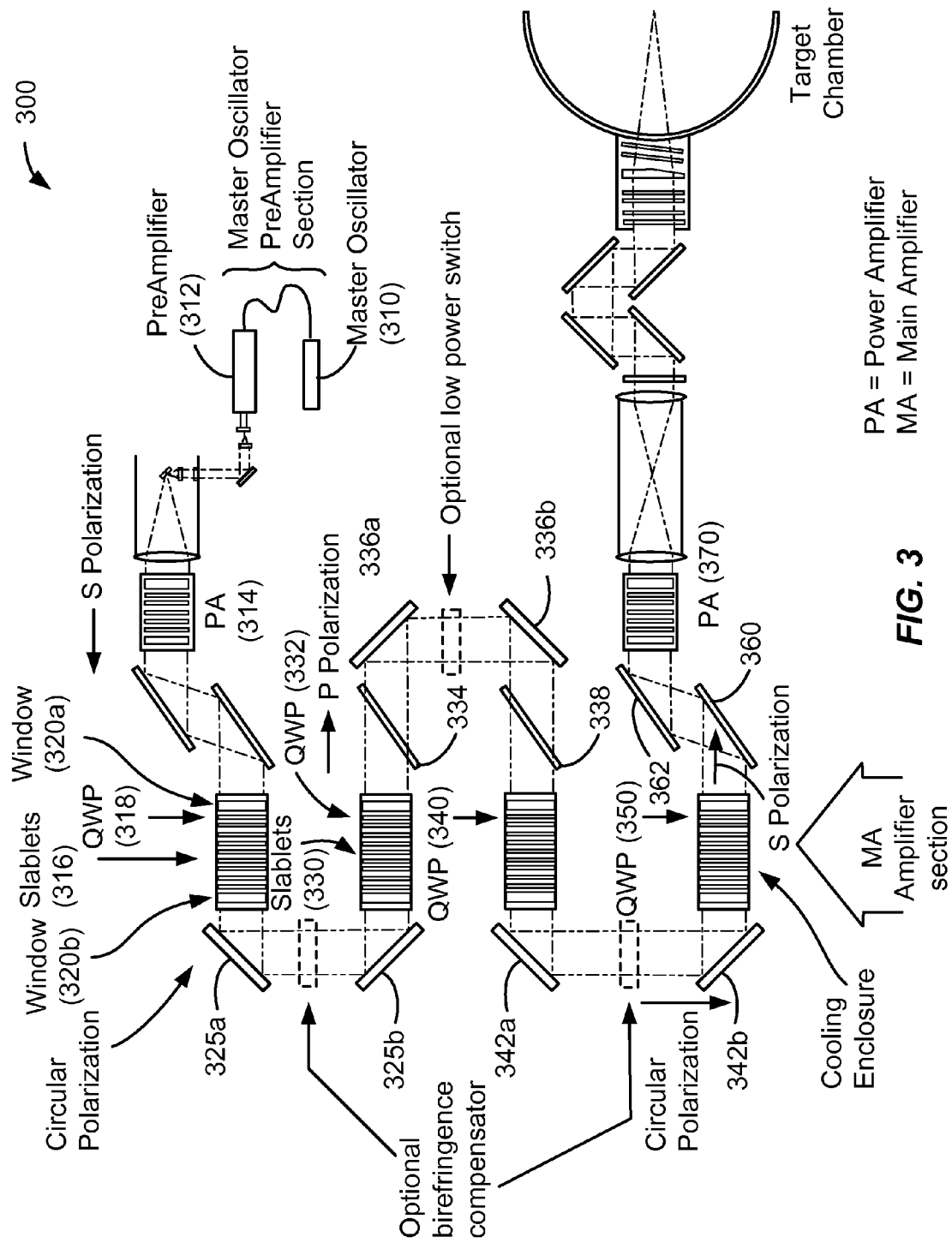
FIG. 3 is a simplified unfolded view of a multi-pass amplifier according to an embodiment of the present invention.

FIG. 3 is a simplified unfolded view of a multi-pass amplifier 300 according to an embodiment of the present invention. As illustrated in FIG. 3, light from a master oscillator 310 and preamplifier 312 is injected into the power amplifier 314 in the S-polarization. Injection of a first beamline with S-polarization (also referred to as horizontal polarization) may occur just before the pinhole plane of TSF that is utilized in conjunction with the multi-pass amplifier 300. Light enters the first amplifier module including slablets 316 and passes through a quarter wave plate (QWP) 318 that converts the S-polarized light into circularly polarized light. The circularly polarized light passes through the slablets 316 positioned at normal incidence, in contrast with designs using slabs at Brewster's angle. The slablets 316 are positioned between windows 320a and 320b in order to enable cooling of the slablets 316 using helium or other suitable coolant gas as discussed above. Passing through the amplifier/gain slablets (also referred to as amplifier slabs, gain slabs, or slablets) where the beamline experiences gain at normal incidence provides the benefit of reducing the non-linear index by a factor of ⅔ from the original value, thereby decreasing the ΔB. Thus, embodiments of the present invention utilize amplifier modules that can be referred to as a "Normal Amplifier" because light is incident on the amplifier slablets at normal incidence. As discussed more fully below, the Normal Amplifier (also referred to as an amplifier module) includes a plurality of amplifier slablets 316, a quarter-wave plate 318 and optional windows 320a/b that are all nominally positioned at normal incidence to the beams that propagate through them. Depending on the particular implementation, the number of slablets in each amplifier module can range from about 10 slablets to about 100 slablets. In a specific embodiment, between 50 and 60 slablets are utilized.

After the pass through the first amplifier module, the beam is reflected into the second amplifier module using, for example, a set of reflectors 325a and 326b that may be dielectric mirrors or angle discriminating reflectors. The second and subsequent amplifier modules share common elements with the first amplifier module. Similar elements may or may not be discussed in the description that follows for purposes of clarity and conciseness. In the illustrated embodiment, an amplifier module includes a set of windows (which may be commonly shared with other amplifier modules as described below), a QWP, and a set of amplifier slablets. The amplifier module may include other elements as appropriate to the particular application. One of ordinary skill in the art would recognize many variations, modifications, and alternatives.

After making an amplification pass through the slablets 330 in the second amplifier module, the QWP 332 converts the light to P-polarization (also referred to as vertical polarization) as illustrated in FIG. 3. The light then passes through a polarizer 334 aligned to pass the P-polarization state and is reflected by a set of mirrors 336a and 336b as discussed below. This set of mirrors can be dielectric mirrors, angle discriminating reflectors, or the like. The light (in the P-polarization state) passes through another polarizer 338 and propagates to the entrance of a third amplifier module.

Like the first amplifier module including slablets 316, a QWP is positioned at the entrance to the third amplifier module, in order to convert the light from the P-polarization state to circular polarization. During the amplification pass through the amplifier slablets in the third amplifier module, the light is circularly polarized as illustrated in FIG. 3. Another set of mirrors 342a and 342b, which may be dielectric mirrors, angle discriminating reflectors, or the like, is utilized to form an optical path between the third and fourth amplifier modules. Light is converted back to S-polarization by the QWP 350 in the fourth amplifier module, exiting after the fourth amplification pass in the S-polarization. The S-polarized light reflects off a polarizer 360 and a mirror 362, where it is directed toward the PA 370, which may include a set of amplifier slabs (or slablets) oriented at Brewster's angle. By using slablets, only a single set of windows is used for each amplifier module, rather than a set of windows for every slab. In some embodiments, multiple amplifier modules may be combined in a single cooling enclosure, which may reduce the number of windows. In some embodiments, power amplifier 314 and power amplifier 370 are a same power amplifier operable to provide initially amplified light to the first amplifier module and to receive amplified light from the fourth amplifier module. In the embodiment illustrated in FIG. 3, the main amplifier (MA) amplifier section includes the four amplifier modules discussed above.

It should be noted that as described more fully below, additional beamlines can be injected into the amplifier system, for example, a fourth beamline can be injected into the TSF at the bottom of FIG. 3, propagating in the reverse direction at a small angle with respect to the first beamline illustrated in FIG. 3.

Referring to FIG. 3, several optional elements are illustrated. Optional birefringence compensators can be placed between the first and second amplifier modules as well as between the third and fourth amplifier modules to compensate for birefringence accumulated in the amplified beams. Both birefringence compensators are optional. Additionally, it is possible to insert a "low power" switch between the second amplifier module and the third amplifier module. The term "low power" is used in comparison to the beam intensity after the pass through the fourth amplifier module. Since the optional switch can be utilized after the second amplifier module, the power is significantly less than after the fourth amplifier module, enabling switches to be used that are suitable for use at lower powers than associated with the amplification pass through the fourth amplifier module.

Figure 4A:
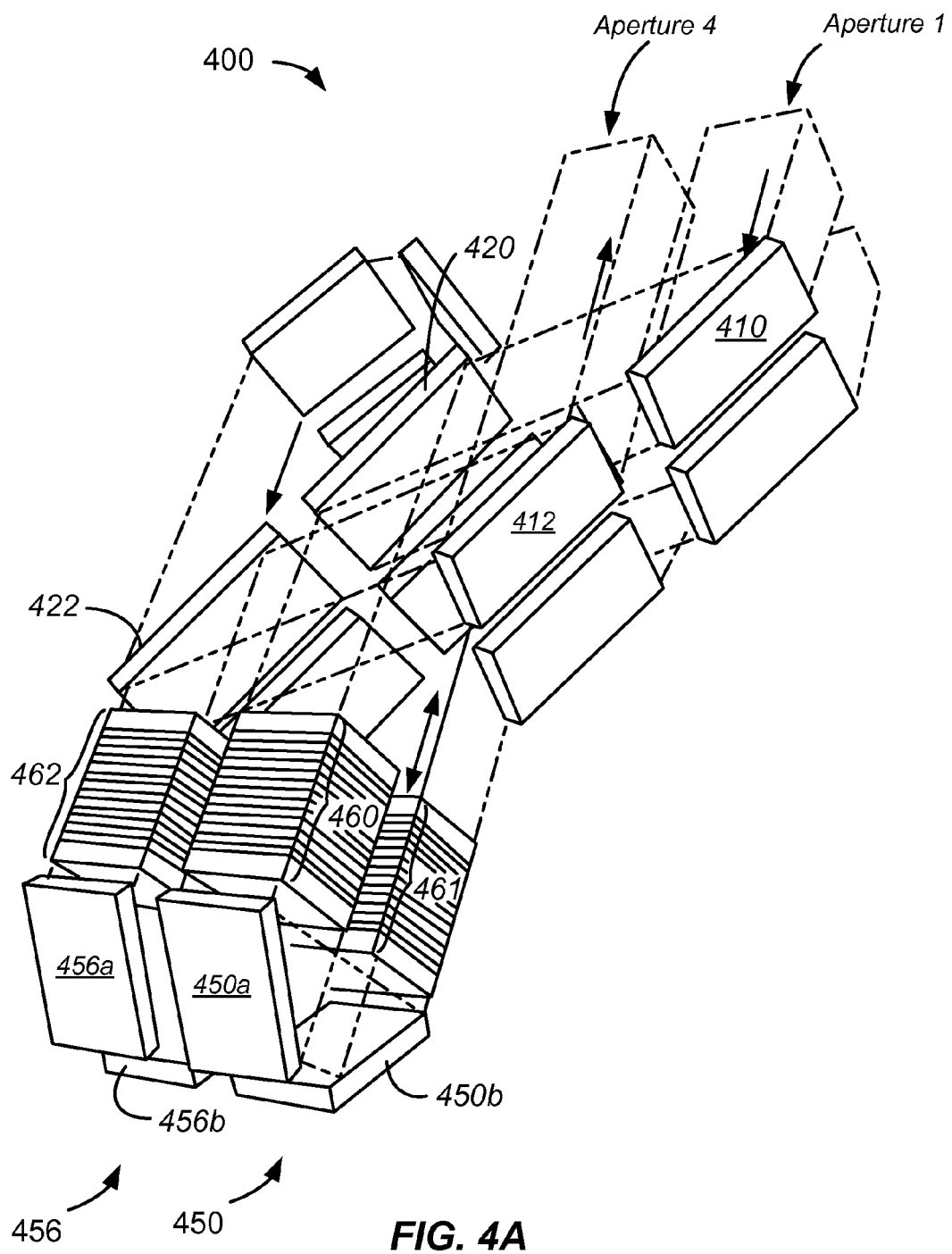
FIG. 4A is a three dimensional view of a multi-pass amplifier according to an embodiment of the present invention.

FIG. 4A is a three dimensional view of a multi-pass amplifier system 400 illustrated according to an embodiment of the present invention. The architecture illustrated in FIG. 4A is related to the unfolded architecture illustrated in FIG. 3. As described below, the amplifier system illustrated in FIG. 4A provides a "quad" of four normal incidence amplifier modules 460, 461, 462, and one not shown) in which the amplified beams share components. The multi-pass amplifier illustrated in FIG. 4A does not include the master oscillator 310, preamplifier 312, or power amplifiers 314/370 illustrated in FIG. 3. Of course, depending on the particular implementation, these additional optical systems may be integrated with the multi-pass amplifier. The elements illustrated in FIG. 4A may also be referred to as a main amplifier system 400.

Light enters the multi-pass amplifier system 400 (for example, through Aperture 1) as S-polarized light and reflects off mirror 410. The S-polarized light is then reflected off of polarizer 420 toward the first amplifier module 460, which includes a set of windows surrounding a QWP and a plurality of amplifier slablets (See, for example, FIG. 3 for additional description related to amplifier modules). The light passes through the QWP and is converted to circular polarization. After reflection off mirror 450a and mirror 450b (making up 45° mirror set 450), light passes through second amplifier module 461. The second amplifier module 461 also includes a QWP, for example, at the end opposing mirror 450b, which converts the light to P-polarization. In the P-polarization, the light (after two amplification passes), passes through a polarizer (not shown) positioned under polarizer 420 and reflects off a set of 45° mirrors (not shown). The light then passes through a polarizer (not shown) that is positioned below polarizer 422 and aligned with the P-polarized light. Because of the three-dimensional nature of the amplifier architecture, consideration of both FIG. 3 and FIG. 4A in conjunction with each other is helpful in understanding embodiments of the present invention.

The light them makes two more amplification passes, first through a third amplifier module (not shown) and fourth amplifier module 462. The third and fourth amplifier modules include a QWP on the side opposing 45 mirror set 456, which converts the light from P-polarization to circular polarization (during amplification) and then to S-polarization. The S-polarized light exiting the fourth amplifier module 462 reflects off polarizer 422 toward mirror 412, where it is reflected out of the main amplifier system. Thus, embodiments of the present invention provide an amplifier system with four amplification passes that does not require the use of a switch. As described in relation to some embodiments of the present invention, a switch can optionally be used, for example, after the second amplification pass, to improve system performance. One of ordinary skill in the art would recognize many variations, modifications, and alternatives.

Referring to FIG. 4A, light along one beamline will enter at a first aperture (e.g., the aperture leading to mirror 410—Aperture 1) and exit at another aperture (e.g., the aperture downstream from mirror 412—Aperture 4). For implementations utilizing four beamlines, each beamline will enter at one aperture and exit at another. For example, a beam entering Aperture 4 will exit at Aperture 1. Additionally, the beams can be canted at a small angle (e.g., 1 mrad) with respect to each other to provide multiple passes propagating along slightly different beam paths. The beams can be canted at other angles, for example, angles ranging from about 1 mrad to about 3 mrad or less than 1 mrad. Thus, embodiments of the present invention provide an amplifier architecture having a four pass geometry in which each beam only makes a single pass through each amplifier module. Additionally, no polarization switch is used in the embodiment illustrated in FIG. 4. In four beam implementations, four beams are amplified as each of the four beams makes a pass through each of the four amplifier modules (i.e., four beams and four pass amplification for each beam), which is suitable to provide high power output with a reasonable size front end. One of ordinary skill in the art would recognize many variations, modifications, and alternatives.

In one embodiment, four beamlines are utilized:
Beamline 1 enters TSF1 and exits TSF4
Beamline 4 enters TSF4 and exits TSF1
Beamline 2 enters TSF1 and exits TSF3
Beamline 3 enters TSF4 and exits TSF2

Embodiments of the present invention provide benefits not available using conventional architectures including the reduction of the number of telescopes used along the optical path. As an example, comparing FIG. 3 to FIG. 2, the telescope that serves as the cavity spatial filter (CSF) is not present in the architecture illustrated in FIG. 3. As an example of the size reduction provided by the elimination of the CSF, in NIF, the CSF relays an image plane about 22 meters (equal to the length of the CSF telescope) for an overall optical cavity length of 44 meters, whereas in some embodiments, the entire main amplifier system illustrated in FIG. 4 is packed into a module about 6 meters in length. Additionally, vignetting losses are reduced by embodiments of the present invention in comparison with conventional architectures.

Additionally, problems related to beam cleanup issues are reduced by embodiments of the present invention. Because no optical switch is utilized and the optical elements are more closely packed as illustrated in FIG. 4, less beam cleanup is required. Beam cleanup can be performed in some embodiments using only the TSF and/or narrow range angular coatings on the mirrors or other optical elements present in the system. As an example, angle discriminating coatings can be utilized on one or more reflective or transmissive optics along the beam path including mirrors and/or polarizers. Thus, a variety of bulk angular discriminating optics are available as options and the filtering does not have to occur at the focal point, but discrimination can be performed at large apertures, either as a coating or as bulk material, where it is easier to dissipate heat. Thus, using large aperture angular discrimination can reduce the loads of any other spatial filters that are used in the system, if spatial filters are used.

The four amplifier modules illustrated in FIG. 4A (460, 461, and 462 are shown) can be packaged in two or more separate cooling enclosures or in a single cooling enclosure as appropriate to the particular application.

Figure 4B:
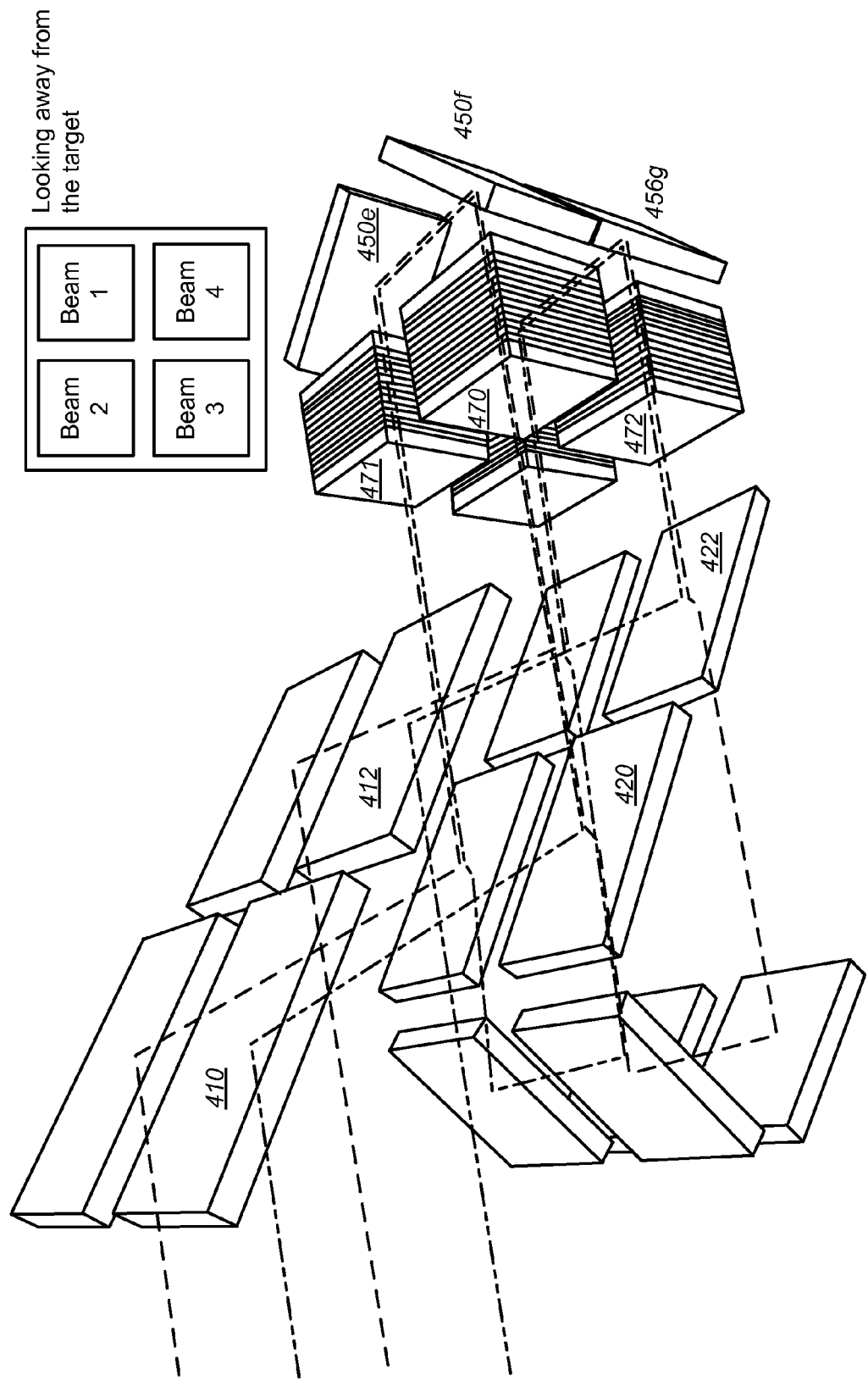
FIG. 4B is a three dimensional perspective diagram illustrating ray trace paths through a multi-pass amplifier according to an embodiment of the present invention.

FIG. 4B is a three dimensional perspective diagram illustrating ray trace paths through a multi-pass amplifier according to an embodiment of the present invention. The three dimensional perspective diagram illustrated in FIG. 4B shares some common components with that illustrated in FIG. 4A. As illustrated in FIG. 4B, the amplifier modules may also be coupled by the 45 degree mirrors oriented to provide two amplification passes in a horizontal plane (e.g., Beam 1 and Beam 2), rather than the vertical plane illustrated in FIG. 4A. Accordingly, light passing through amplifier module 471 is reflected toward amplifier module 470 by reflectors 450*e* and 450*f*.

Figure 4C:
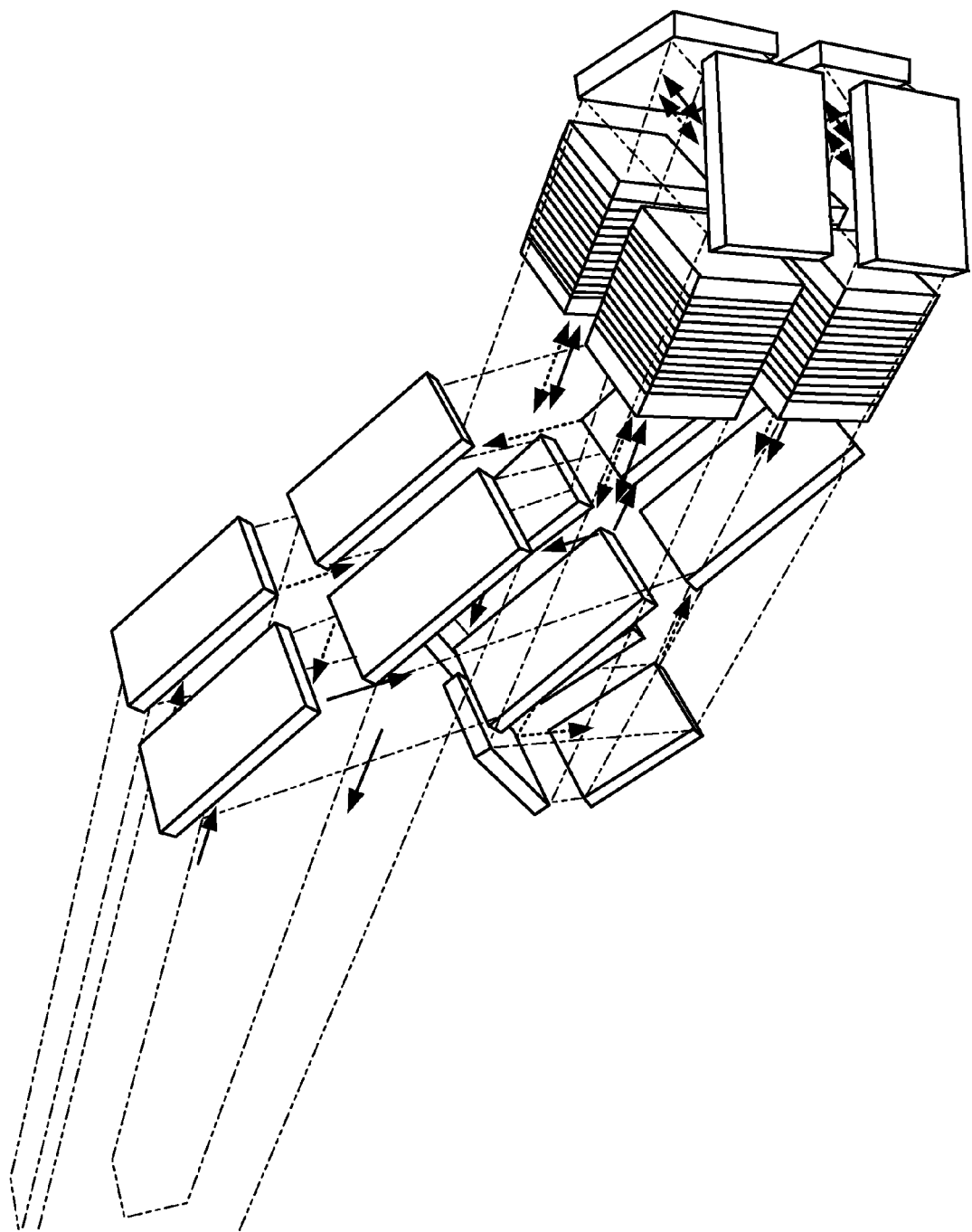
FIG. 4C is a three dimensional perspective view of a multi-pass amplifier viewed from a first direction according to an embodiment of the present invention.
Figure 4D:
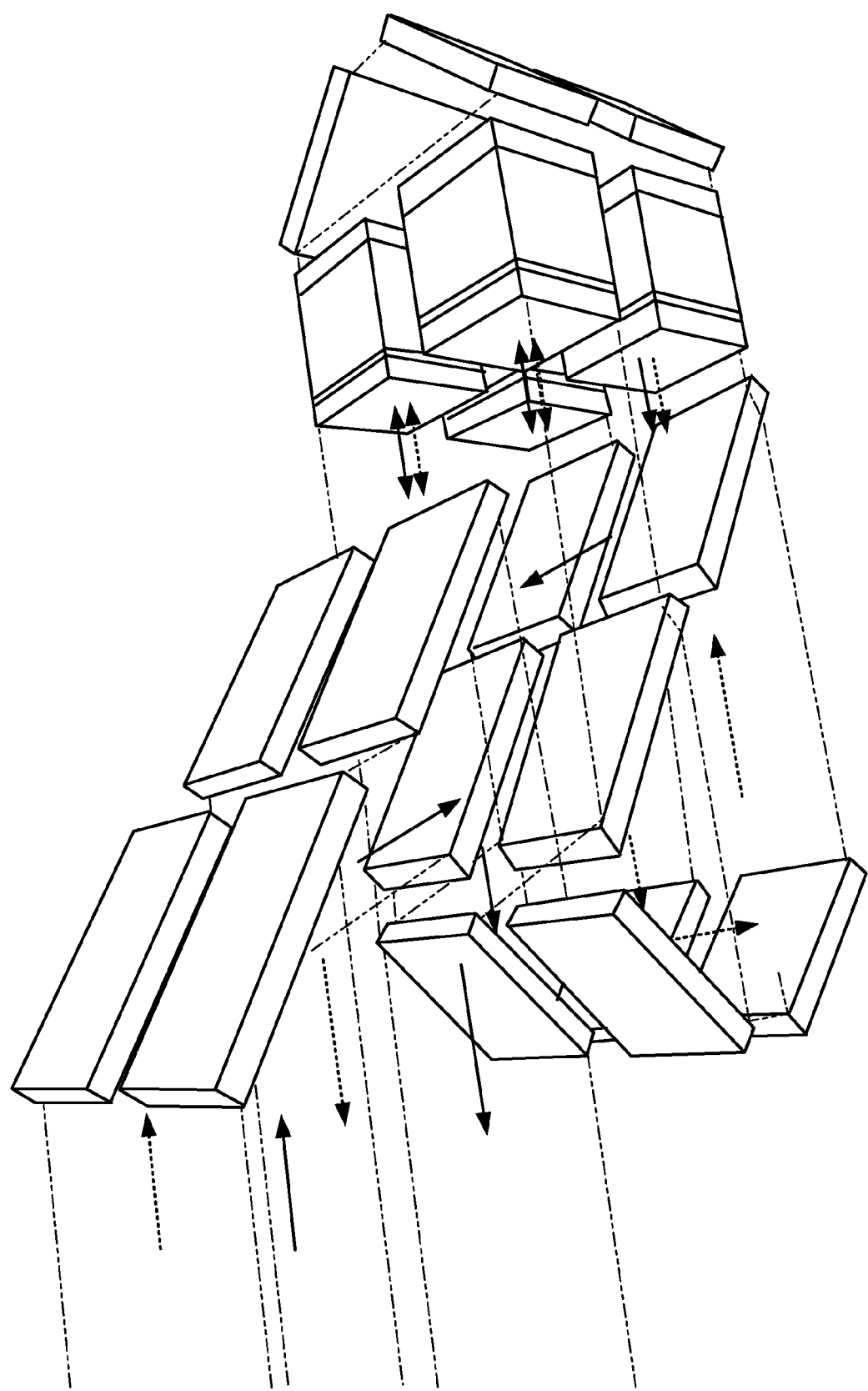
FIG. 4D is a three dimensional perspective view of a multi-pass amplifier viewed from a second direction according to an embodiment of the present invention.

FIG. 4C is a three dimensional perspective view of multi-pass amplifier viewed from a first direction according to an embodiment of the present invention. FIG. 4D is a three dimensional perspective view of a multi-pass amplifier viewed from a second direction according to an embodiment of the present invention. The multi-pass amplifiers illustrated in FIGS. 4C and 4D share common components with the amplifier systems illustrated in FIGS. 4A and 4B and are not labeled for purposes of clarity and conciseness.

Figure 5:
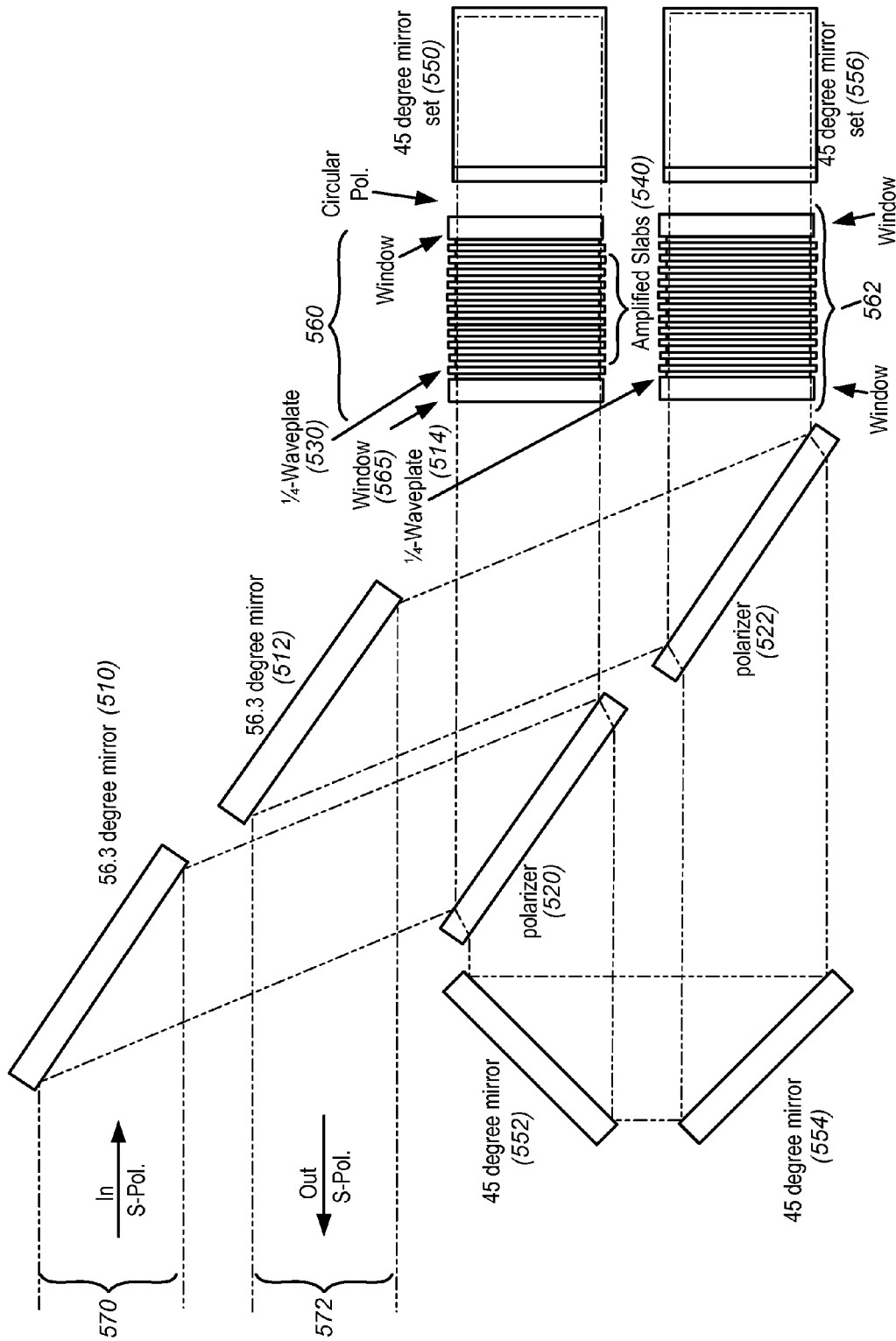
FIG. 5 is a simplified schematic diagram illustrating a top half of a multi-pass amplifier according to an embodiment of the present invention.

FIG. 5 is a simplified schematic diagram illustrating a top half of a multi-pass amplifier according to an embodiment of the present invention. As described below, two additional amplifier modules (not shown) complete a four amplifier module system in some embodiments. In FIG. 5, a single beamline of a quad of beamlines are illustrated, showing two amplifier modules 560 and 562 (Normal Amplifiers). These Normal Amplifiers can be compared to the first and second amplified modules discussed in FIG. 3. Light enters the amplifier system with an S-polarization (570), reflects of mirror 510 and off of polarizer 520. The input light passes through one of the windows (window 565) surrounding the quarter wave plate (QWP) 530 and the set of amplifier slablets 540. The QWP 530 converts the light with S-polarization to circular polarization and the beam is amplified by the amplifier slablets 540. The light is substantially at normal incidence to the QWP and the amplifier slablets in the first amplifier module 560. After the first amplification pass, the light is reflected by the 45 degree mirror 550 to a second amplifier module (not shown) behind the plane of the figure. The light makes a second amplification pass and is converted to P-polarization by the QWP in the second amplifier module. Because the light is in the P-polarization state, it passes through polarizer 520, which extends into and behind the plane of the figure, and is reflected off 45 degree mirrors 552 and 554. Polarizer 520 could also be two polarizers that are stacked along a line normal to the plane of the figures.

The light in the P-polarization state passes through polarizer 522 (extending behind the plane of the figure or a polarizer positioned behind the plane of the figure) and enters a third amplifier module (not shown) behind the plane of the figure. The QWP in the third amplifier module converts the light to circular polarization and after amplification, the light is reflected by 45 degree mirror set 566 to impinge on the fourth amplifier module 562. After the fourth amplification pass, the light is converted to S-polarization by QWP 514 and is reflected from polarizer 522 and mirror 512 to exit the system. Although entrance aperture 570 is labeled as "In" and exit aperture 572 is labeled as "Out," it will be appreciated that in a multi-beam system (e.g., a four beam system), a second beamline will be entering at aperture 572 and exiting at aperture 570. Thus, "In" and "Out" are only applicable to one of the multiple beamlines.

Figure 6:
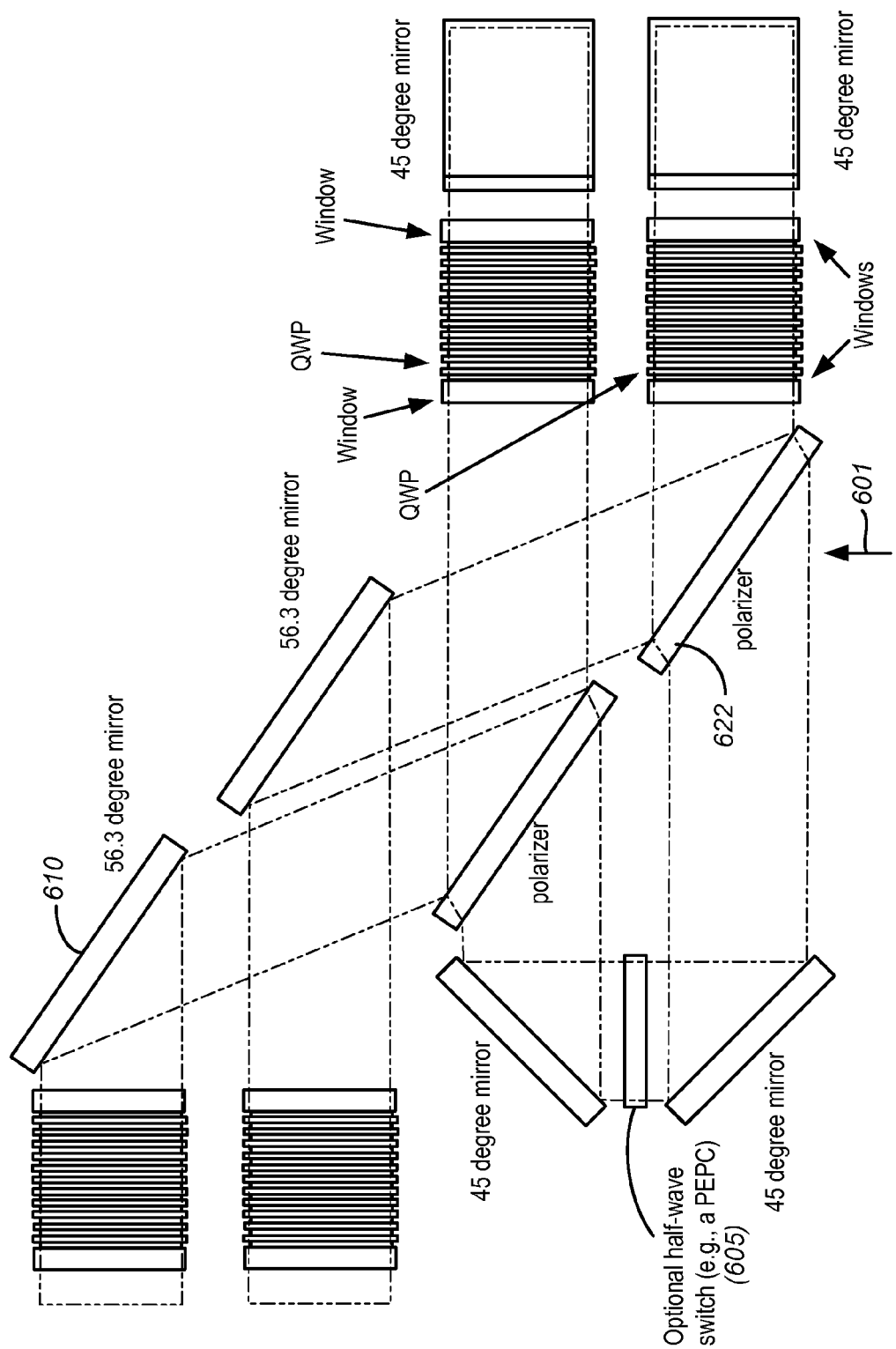
FIG. 6 is a simplified schematic diagram illustrating a top half of a multi-pass amplifier including a polarization switch according to an embodiment of the present invention.

FIG. 6 is a simplified schematic diagram illustrating a top half of a multi-pass amplifier including a polarization switch according to an embodiment of the present invention. The multi-pass amplifier system illustrated in FIG. 6 shares common elements with the multi-pass amplifier system illustrated in FIG. 5 and common elements are not necessarily described for purposes of clarity and conciseness. As illustrated in FIG. 6, switch 605, which may be a half-wave switch such as a PEPC, is inserted in the optical path after the light has traveled through two of the amplifier modules. In an "off" state, the half-wave switch would act as a half wave plate, thereby blocking transmission of light through the system. When the extraction pulse is due, the switch will be energized to the "on" state, in which state the switch would be a zero-wave plate, thereby permitting the extraction pulse to pass through the polarizers aligned with the polarization of the pulse. Although the switch is shown in the plane containing the two amplifier modules 360 and 362, it will be appreciated that a switch in the top plane will be active for the beamlines starting and ending in the plane positioned behind the plane of the figure. The switch for the beamlines entering and exiting in the plane of the figure will be placed in the plane behind the figure.

Placement of switch 605 at a position between the second and third amplifier modules enables amplified spontaneous emission (ASE) and other undesired light (stray light from glints) that can reduce the amplification efficiency to be blocked after at most two passes through the amplifier modules. For some applications, the fluences associated with two passes is less than or equal to about 100 Joules. Therefore, the fluence experienced by switch 605 is much less than the fluence experienced by the polarization switch illustrated in FIG. 1. Comparing FIGS. 1 and 6, the placement of the polarization switch in FIG. 1 results in an exposure to the full fluence associated with four amplification passes (~10 KJ), several orders of magnitude greater than the fluence after two amplification passes that is experienced by switch 605. The lower power experienced by switch 605 enables the use of multiple options for switching, including Pockels cell, employing a transparent electrode made, for example, using indium/tin/oxide coatings (see, for example, W. T. Pawlewicz, I. B. Mann, W. H. Lowdermilk and D. Milam, Laser-damage—resistant transparent conductive indium tin oxide coatings, Appl. Phys. Lett. 34(3), 1 Feb. 1979) as demonstrated at centimeter scale (see, for example, M. D. Skeldon, M. S. Jin D. J. Smith and S. T. Bui, Performance of longitudinal mode KD*P Pockels cells with transparent conductive electrodes, SPIE Vol. 1410 Solid State Lasers II (1991)), other suitable transparent electrodes, or the like.

Figure 7:
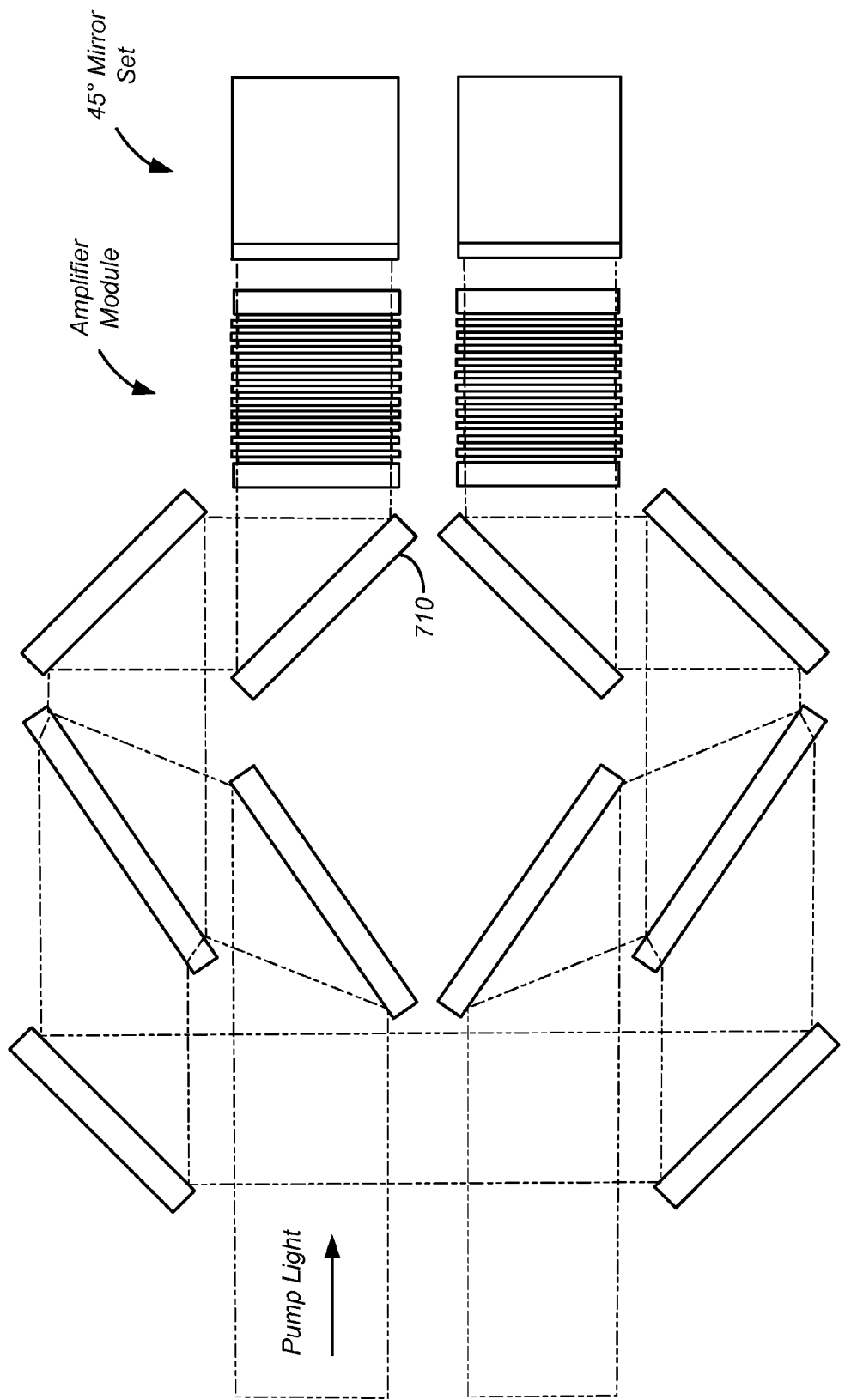
FIG. 7 is a side view of a multi-pass amplifier including a pump light injection system according to an embodiment of the present invention.

FIG. 7 is a side view of a multi-pass amplifier including a pump light injection system according to an embodiment of the present invention. The multi-pass amplifier illustrated in FIG. 7 shares common elements with the multi-pass amplifier system illustrated in FIG. 5 and common elements are not necessarily described for purposes of clarity and conciseness. Amplifier modules and 45° mirror sets to direct the beam into the set of amplifier modules behind the plane of the figure are illustrated in FIG. 7. In the embodiment illustrated in FIG. 7, pump light is injected using dichroic mirrors to enable face pumping of the amplifier slablets along a direction aligned with the light beam to be amplified (normal incidence). The positions of the polarizers and mirrors used to direct the amplified beams can be adjusted to allow for the placement of the dichroic mirrors 710 used to pump the gain media. The design illustrated in FIG. 7 enables the pump light to reach the gain media while still maintaining high efficiency for the amplified light beams.

Optical concentrators or ducts of various types may be used to direct the diode pump light into the amplifier end faces and/or edges. Both the lasant concentrations and slablet thicknesses may be varied along the length of the amplifier assembly in order to hold thermally induced phase distortion and thermally induced stress birefringence within acceptable tolerances.

Figure 8:
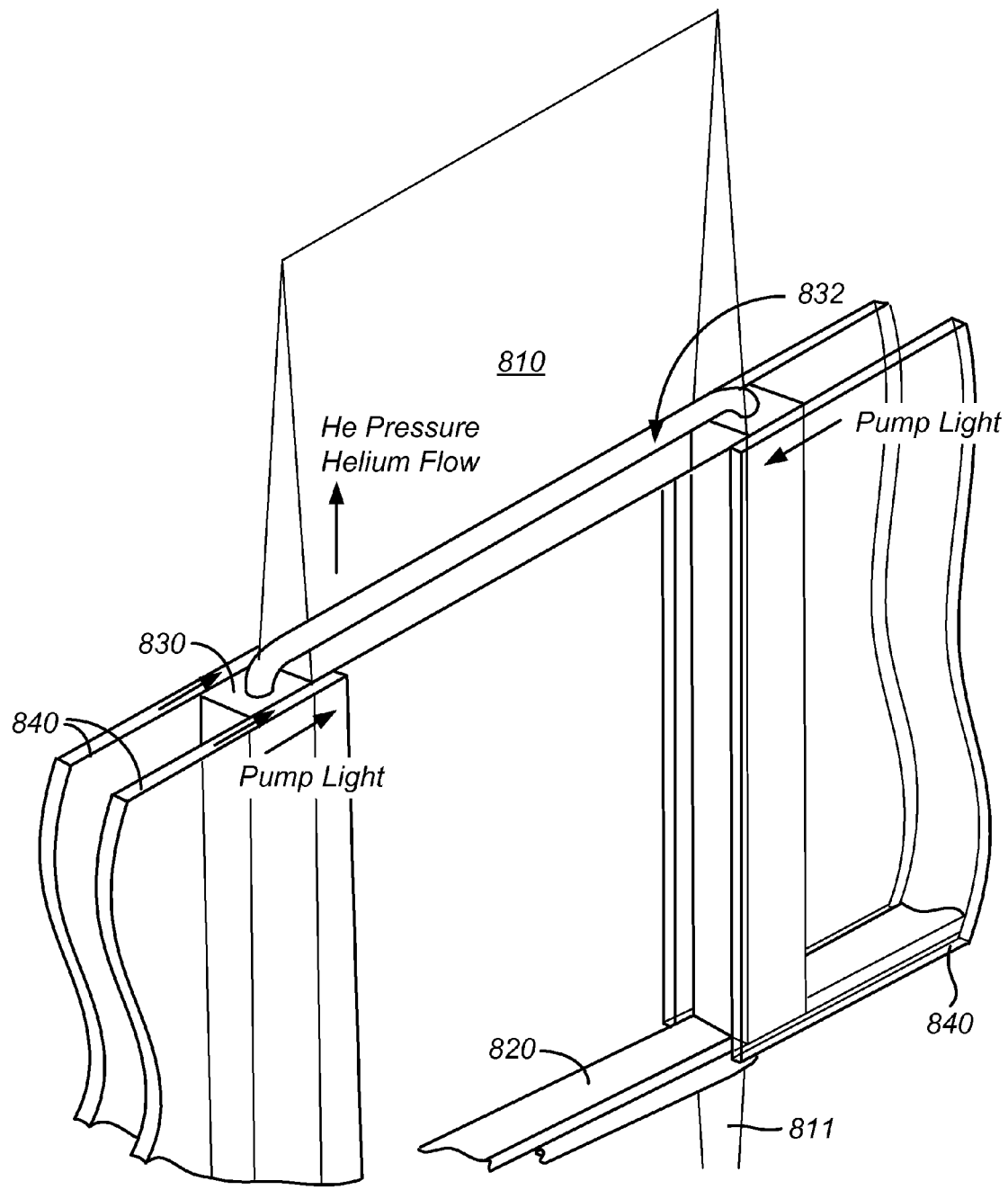
FIG. 8 is a perspective drawing illustrating a method of gap pumping amplifier slablets according to an embodiment of the present invention.

FIG. 8 is a perspective drawing illustrating a method of gap pumping amplifier slablets according to an embodiment of the present invention. In FIG. 8, a single amplifier slablet is illustrated, although multiple slablets will typically be utilized as illustrated in FIG. 3 and other figures described herein.

A fin 810 that is shaped in a generally conical shape is attached to the top surface of the amplifier slablet 820. A similar fin 811 is attached to the bottom edge of the amplifier slablet. The fins provide an aerodynamic environment that enhances the flow of the high pressure helium used as the cooling fluid. In the illustrated embodiment, the helium is flowing up past the amplifier slablet 820 and fins 810 and 811.

The amplifier slablet has an edge cladding 830 positioned around the edges of the amplifier slablet for collecting the ASE that propagates across the slablets. The edge cladding 830 is cooled in the illustrated embodiment by circulating water through the edge cladding cooling channels 832. Pump light is injected through ducts 840 in a direction perpendicular to the direction of propagation of the amplified light. The ducts separate the slablets from each other, with a gap between the slablets through which the cooling gas flows.

In a particular embodiment, the ducts 840 are characterized by predetermined dimensions, for example, plates approximately 3 mm thick and approximately 40 cm long. The ducts overlap with the edge cladding and form spacers between the slablets. The pump light exits the duct on the inner surfaces of the ducts positioned between the slablets and propagates into the region between adjacent slablets. Because the pump light diffracts as it exits the duct, or by design of the duct surface, the pump light enters the gap region with a spread of angles. As the light in the lower index region between amplifier slablets impinges on the higher index slablets, the pump light is coupled into the amplifier slablets, providing gain.

The faces of the amplifier slablets can be etched or otherwise enhanced to increase the coupling of the pump light from the gap region into the amplifier slablets. Thus, although the amplifier slablets can be AR coated for normal incidence light using etching, by a solgel layer, or the like, they can absorb the pump light through these faces. As an example, the faces of the slablets could be etched with an irregular pattern or other suitable treatment to increase the coupling of the pump light into the amplifier slablets by scattering, deflection, or the like.

In some embodiments, the output surfaces of the ducts 840 can be angled to match the numerical aperture of the duct to the amplifier slablet coupling coefficient to provide for uniform absorption of the pump light across the amplifier slablet. As discussed above, structures that scatter mildly when viewed from an angle and act as an AR coating at normal incidence can be used that couple the pump light into the amplifier slablets effectively while still providing high quality coatings in terms of damage performance. Fiber couplers joined to semiconductor lasers can also be utilized according to some embodiments to replace or supplement the ducts 840.

Figure 9:
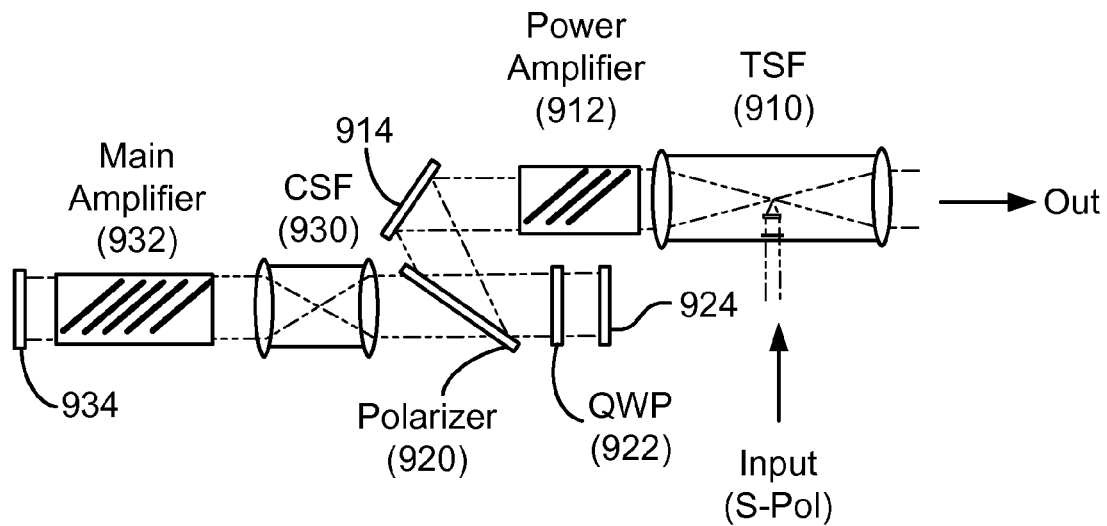
FIG. 9 is a simplified schematic diagram illustrating a two-pass amplifier architecture according to an embodiment of the present invention.
Figure 10:
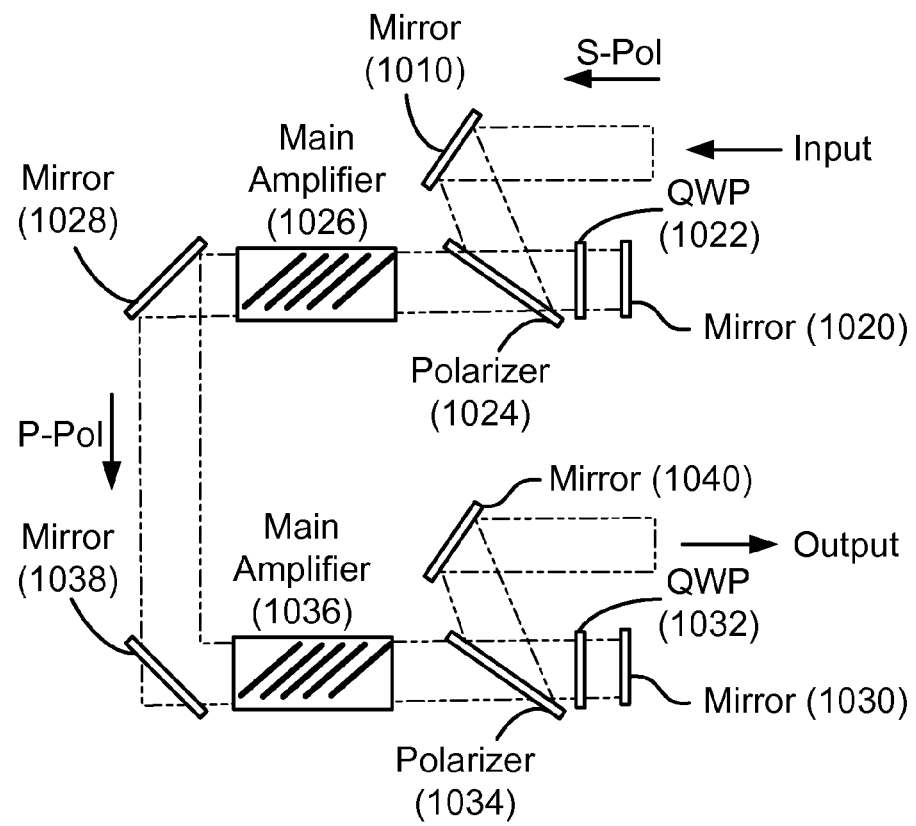
FIG. 10 is a simplified schematic diagram illustrating integration of a set of two-pass amplifier architectures according to an embodiment of the present invention.

FIG. 9 is a simplified schematic diagram illustrating a two-pass amplifier architecture according to an embodiment of the present invention. As illustrated in FIG. 9, a two-pass architecture can be implemented that does not include a switch (e.g., a PEPC) to prevent ASE or a large aperture Faraday rotator. The amplifier slablets utilized in FIG. 9, as well as in other embodiments of the present invention, can be positioned to receive light at substantially normal incidence (not at Brewster's angle) and anti-reflection (AR) coated or may be positioned to receive light at Brewster's angle and not be AR coated. FIG. 10 is a simplified schematic diagram illustrating integration of a set of two-pass amplifier architectures according to an embodiment of the present invention. In the embodiment illustrated in FIG. 10, two two-pass beamlines can be stacked and shared such that the laser pulses do not traverse the same optical element more than once.

Referring to FIG. 9, light enters the system through the TSF 910 in the S-polarization. The light is amplified by the power amplifier 912, which in the illustrated embodiment, includes a plurality of slablets positioned at Brewster's angle. After reflection off mirror 914, the input light reflects off the polarizer 920, which is aligned to reflect light in the S-polarization and pass light in the P-polarization. The reflected light is then is converted into circular polarization by the QWP 922. After reflection off mirror 924, the second pass through the QWP 922 converts the light to the P-polarization, which enables the light to pass through the polarizer 920 and enter the CSF 930. The CSF, which is optional in some embodiments, filters the light to improve the beam quality. The light in the P-polarization makes a first pass through the main amplifier 932, which includes a plurality of slablets oriented at Brewster's angle in the illustrated embodiment. After reflection off mirror 934, the light makes a second pass through the main amplifier 932 to achieve two amplification passes. The amplified light passes through the optional CSF 930, the polarizer 920 and is converted into circularly polarized light by the QWP 922. After a final reflection off of mirror 924, the QWP converts the light to S-polarization, which reflects off the polarizer 920 toward mirror 914 as it begins the exit from the amplifier system.

Referring to FIG. 10, light enters the stacked amplifier pair and reflects off mirror 1010. The light in the S-polarization reflects off polarizer 1024 and makes two passes through the QWP 1022 (before and after reflection off of mirror 1020), converting the light in the S-polarization state into P-polarization. The light them passes through the polarizer 1024 and is amplified during the pass through main amplifier 1026. The light is then directed toward the second main amplifier 1036 after reflection from mirrors 1028 and 1038.

The light is amplified a second time as it passes through main amplifier 1036. The twice amplified P-polarized light passes through the polarizer 1034, is converted into S-polarization after two passes through the QWP 1032 (and reflection from mirror 1030), and is reflected out of the amplifier system by reflection off of polarizer 1034 and mirror 1040. Thus, each amplifier is a single pass amplifier for the beamline illustrated in FIG. 10. In the embodiment illustrated in FIG. 10, another beamline can propagate from the output to the input in the reverse direction. One of ordinary skill in the art would recognize many variations, modifications, and alternatives.

Figure 11:
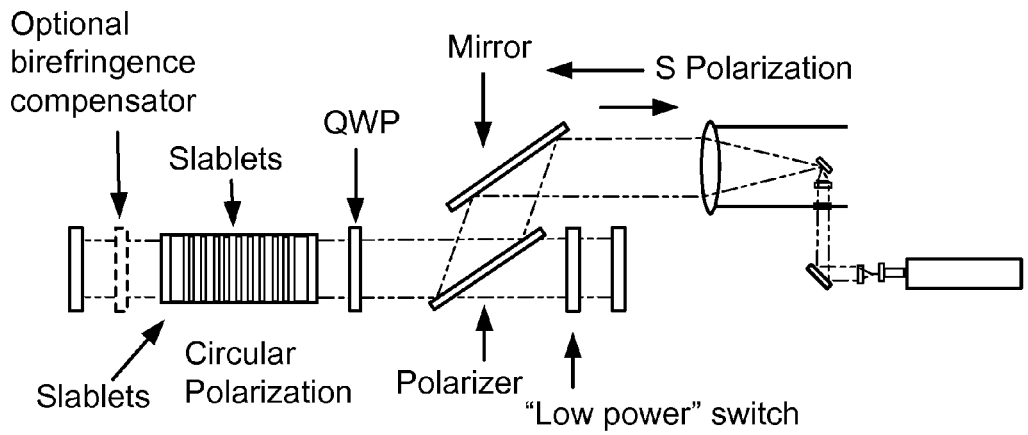
FIG. 11 is a simplified schematic diagram illustrating a single aperture four pass design with a low power PEPC.

FIG. 11 is a simplified schematic diagram illustrating a single aperture four pass amplifier design with a "low power" PEPC. As discussed above, the term "low power" is in comparison to the final output power of optical systems described herein. The amplifier illustrated in FIG. 11 shares common elements with the amplifier system illustrated in FIG. 9 and common elements are not necessarily described or numbered for purposes of clarity and conciseness. As illustrated in FIG. 11, light to be amplified is injected in the S-polarization and reflects off the polarizer toward the QWP, which converts the light to circular polarization. The light passes through the slablets during a first amplification pass and passes through an optical birefringence compensator. The light is reflected back through the optional birefringence compensator prior to a second amplification pass through the slablets. The QWP will convert the polarization to the P-polarization so that the light (having had two amplification passes) passes through the polarizer toward the low power switch. The switch is operated to pass the light so that it can be reflected back toward the slablets. After the light passes through the switch after reflection, the switch can be closed.

Figure 12:
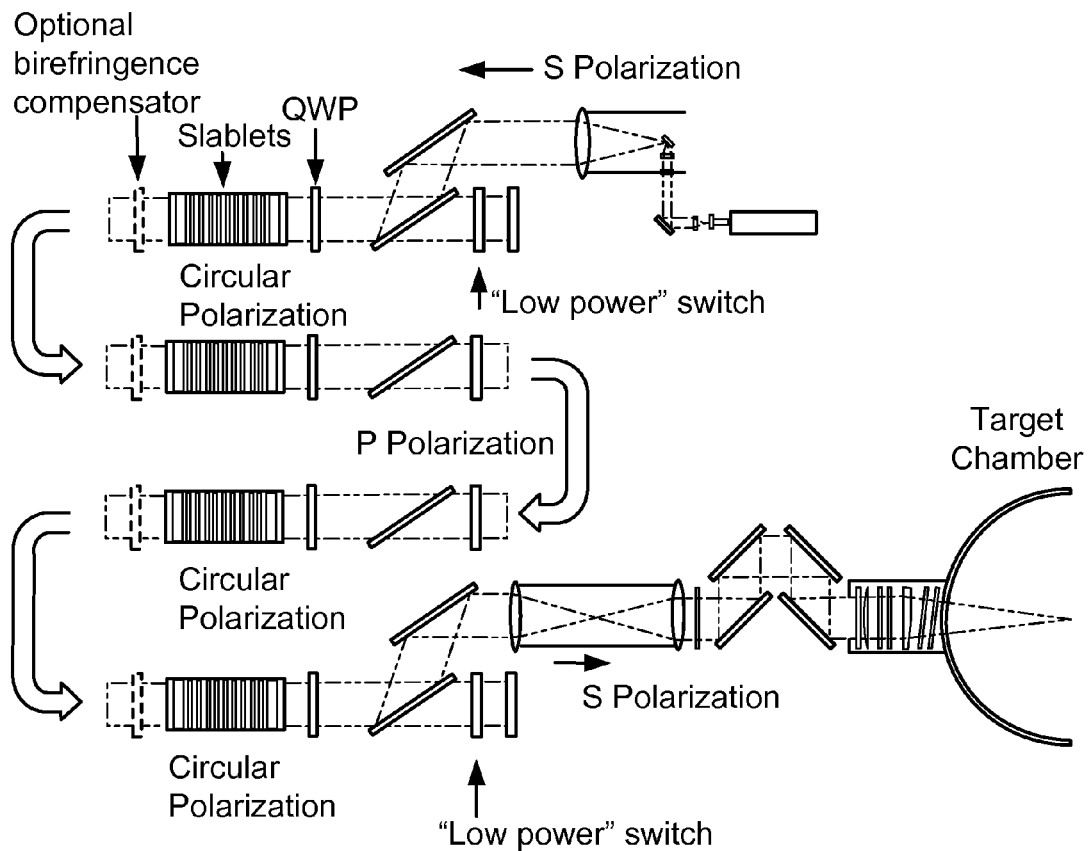
FIG. 12 is an unwound version of the system illustrated in FIG. 11.

The light then passes through the polarizer and the QWP, which converts the light to circular polarization. After two additional amplification passes through the slablets (and the potential birefringence compensator), the light is converted to S-polarization by the QWP and is reflected off the polarizer to exit the amplifier system. FIG. 12 is an unwound version of the system illustrated in FIG. 11, illustrating the optical path during the four amplification passes. The low power switch enables suppression of parasitic modes to be performed using an electro-optic switch operating at power levels less than that of the final amplified beam. In the embodiment illustrated in FIGS. 11 and 12, the parasitic mode suppression is performed after two of four amplification passes. Although embodiments of the present invention are discussed herein in the context of amplifier applications, laser applications are also included within the scope of embodiments of the present invention.

The embodiments illustrated in FIGS. 9-12 may not utilize the three-dimensional architecture discussed in relation to FIGS. 4A-4D, but may be characterized by a two-dimensional architecture in the sense that amplifier modules are not necessarily arrayed in two dimensions. Referring to FIG. 4D, the amplifier modules are arrayed as a 2×2 array in a plane substantially orthogonal to the direction of propagation of the light being amplified in the amplifier modules. This geometry may not be needed in the embodiments illustrated in FIGS. 9-12. Thus, the embodiments illustrated in FIGS. 9-12 may be considered as a subset of the more general three-dimensional geometries illustrated in FIGS. 4A-4D. One of ordinary skill in the art would recognize many variations, modifications, and alternatives.

In some embodiments, it may be desirable to include birefringence compensators as indicated in FIGS. 3 and 11. Stress induced birefringence may cause spatially dependent depolarization of the laser pulses passing through the laser amplifiers. The addition of a compensator plate may be required to reverse the sign of the depolarization between amplifier passes so as to allow the identically distorted following amplifier to correct the polarization state.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A main amplifier system comprising: a first reflector operable to receive input light through a first aperture and direct the input light along an optical path, wherein the input light is characterized by a first polarization;
   a first polarizer disposed along the optical path, wherein the first polarizer is operable to reflect light characterized by the first polarization state;
   a first set of amplifier modules disposed along the optical path, wherein each of the first set of amplifier modules comprises:
      an entrance window;
      a quarter wave plate;
      a plurality of amplifier slablets arrayed substantially parallel to each other; and
      an exit window;
   a second set of amplifier modules disposed along the optical path, wherein each of the second set of amplifier modules comprises:
      an entrance window;
      a quarter wave plate;
      a plurality of amplifier slablets arrayed substantially parallel to each other; and
      an exit window;
   a set of mirrors operable to reflect light exiting the first set of amplifier modules to enter the second set of amplifier modules;
   a second polarizer disposed along the optical path, wherein the second polarizer is operable to reflect light characterized by a second polarization state; and
   a second reflector disposed along the optical path and operable to direct light through a second aperture.

2. The main amplifier system of claim 1 further comprising a corrector plate operable to mitigate at least one of phase or polarization error.

3. The main amplifier system of claim 1 wherein the optical path extends from the first aperture to the second aperture.

4. The main amplifier system of claim 1 further comprising a power amplifier optically coupled to the input apertures of the main amplifier system.

5. The main amplifier system of claim 1 wherein the plurality of amplifier modules comprise four amplifier modules.

6. The main amplifier system of claim 1 wherein each of the plurality of amplifier modules are cooled by flow of a gas.

7. The main amplifier system of claim 6 wherein the gas comprises helium.

8. The main amplifier system of claim 1 wherein the first polarization state comprises S-polarization and the second polarization state comprises P-polarization.

9. The main amplifier system of claim 1 wherein the first reflector comprises an input reflector for a first beamline and an output reflector for a second beamline.

10. The main amplifier system of claim 1 further comprising a switch positioned between the mirrors of the set of mirrors.

11. A method of amplifying an input pulse, the method comprising:
receiving, through a first aperture, an input pulse having a first polarization state along a beamline of an amplifier system;
reflecting the input pulse off an input mirror;
reflecting the input pulse off a first polarizer as a result of the input pulse having the first polarization state;
converting the first polarization state into a first intermediate polarization state;
amplifying the input pulse in a first plurality of amplifier slablets to provide an amplified pulse having the first intermediate polarization state;
converting the amplified pulse having the first intermediate polarization state into an amplified pulse having a second polarization state;
passing the amplified pulse through the first polarizer as a result of the amplified pulse having the second polarization state;
passing the amplified pulse through a second polarizer as a result of the amplified pulse having the second polarization state;
converting the second polarization state into a second intermediate polarization state;
amplifying the amplified pulse in a second plurality of amplifier slablets to provide an output pulse having the second intermediate polarization state;
converting the second intermediate polarization state into the first polarization state;
reflecting the output pulse off the second polarizer as a result of the output pulse having the first polarization state;
reflecting the amplified pulse off an output mirror; and
directing the output pulse having the first polarization state along the beamline of the amplifier system, through a second aperture.

12. The method of claim 11 wherein the first polarization state comprises P-polarization and the second polarization state comprises S-polarization.

13. The method of claim 11 wherein the first intermediate polarization state comprises circular polarization of first handedness and the second intermediate polarization state comprises circular polarization of a second handedness opposite to the first handedness.

14. The method of claim 11 wherein converting the first polarization state into the first intermediate polarization state comprising passing the input pulse through a quarter wave plate.

15. The method of claim 11 wherein the first and second plurality of amplifier slablets are oriented at a substantially normal angle of incidence.

16. The method of claim 11 wherein the beamline of the amplifier system includes an optical path running from a first aperture to a second aperture different from the first aperture.

17. An optical amplifier system comprising:
a polarizer operable to reflect light having a first polarization state along an optical path;
a quarter wave plate disposed along the optical path;
a first amplifier module comprising a plurality of slablets and operable to receive light passed through the polarizer;
a set of reflectors operable to reflect amplified light from the first amplifier;
a second amplifier module comprising a second plurality of slablets, wherein the set of reflectors is optically positioned between the first amplifier module and the second amplifier module, and
a second quarter wave plate disposed along the optical path downstream of the set of reflectors.

18. The optical amplifier system of claim 17 wherein the amplifier comprises a two-pass amplifier.

19. The optical amplifier system of claim 17 further comprising a power amplifier optically coupled to an input aperture of the optical system.

20. The optical amplifier system of claim 17 wherein the plurality of slablets are operable to receive a flow of cooling gas between the plurality of slablets.

21. The optical amplifier system of claim 17 wherein the plurality of slablets and the second plurality of slablets are arrayed substantially parallel to each other.

22. The optical amplifier system of claim 21 wherein the plurality of slablets and the second plurality of slablets are oriented at a substantially normal angle of incidence.

23. The optical amplifier system of claim 17 further comprising a second polarizer downstream of the second amplifier module and operable to reflect light having a second polarization state along the optical path.

* * * * *